United States Patent
Yoneda et al.

(10) Patent No.: US 10,939,200 B2
(45) Date of Patent: Mar. 2, 2021

(54) AUDIO PROCESSING IN MULTI-OS DEVICES HAVING MULTIPLE AUDIO INPUTS

(71) Applicant: LENOVO (Singapore) PTE. LTD., New Tech Park (SG)

(72) Inventors: Masaharu Yoneda, Yokohama (JP); Limin Xiao, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/697,835

(22) Filed: Nov. 27, 2019

(65) Prior Publication Data

US 2020/0169806 A1    May 28, 2020

(30) Foreign Application Priority Data

Nov. 27, 2018 (JP) .............. JP2018-221471

(51) Int. Cl.
*H04R 3/00* (2006.01)
*G06F 3/16* (2006.01)
*G10L 19/00* (2013.01)

(52) U.S. Cl.
CPC .............. *H04R 3/00* (2013.01); *G06F 3/165* (2013.01); *G10L 19/00* (2013.01)

(58) Field of Classification Search
CPC .......... G06F 13/10; G06F 13/14; G06F 3/165; H04R 3/00; G10L 19/00
See application file for complete search history.

(56) References Cited

U.S. PATENT DOCUMENTS

| 2010/0054709 A1* | 3/2010 | Misawa | G06F 3/1454 386/239 |
| 2014/0044285 A1* | 2/2014 | Kanigicherla | G06F 3/162 381/119 |

FOREIGN PATENT DOCUMENTS

| JP | H1145505 A | 2/1999 |
| JP | 2003099154 A | 4/2003 |
| JP | 2005505003 A | 2/2005 |
| JP | 2006260372 A | 9/2006 |
| JP | 2010081592 A | 4/2010 |
| JP | 2010277592 A | 12/2010 |
| JP | WO2011061878 A1 | 4/2013 |
| WO | 2009/029920 A1 | 3/2009 |

* cited by examiner

*Primary Examiner* — Mark Fischer
(74) *Attorney, Agent, or Firm* — Kunzler Bean & Adamson

(57) ABSTRACT

An apparatus is provided to improve audio processing. The apparatus includes a processor configured to execute a process based on an operating system (OS), and an audio signal processing part to support inputs of a first audio signal which is associated with the OS and a second audio signal which is inputted via a second input unit that is different from the first input unit. The audio signal processing part has a first processing mode and a second processing mode in which the audio signal processing part outputs an audio signal based only on the second audio signal. The apparatus also includes a setting part configured to set the audio signal processing part to the first processing mode when the process based on the OS is executed by the processor and to the second processing mode when the process based on the OS is at least partially limited.

11 Claims, 6 Drawing Sheets

US 10,939,200 B2

AUDIO PROCESSING IN MULTI-OS DEVICES HAVING MULTIPLE AUDIO INPUTS

FIELD

The subject matter disclosed herein relates to information processing devices and more particularly relates to an improved system and method for processing audio signals from multiple inputs in response to an operation state of a signal processing apparatus.

BACKGROUND

An audio codec, which is installed on a personal computer (PC) or the like, decodes audio data received from a central processing unit (CPU) via a bus and outputs an audio signal to a speaker. Some audio codecs support not only an input from the CPU via the bus but also various inputs such as a line input and a microphone input. Examples of audio outputted by the audio codec include an audio signal of a start sound, alarm sound, reproduced sound, etc. of the PC processed by the CPU as well as an audio signal inputted via the line input to the speaker. During a normal operation of the PC, the above audio codec installed on the PC can output both an audio signal from the PC (i.e., the start sound or the like associated with a process) and an audio signal inputted via the line input or others to the speaker. However, when the PC is standing by, sleeping, or shut down and thus a part or all of an operation of the CPU is limited, the audio codec can output neither the audio signal of the start sound or the like associated with a process of the CPU nor the audio signal inputted via the line input or the others to the speaker

SUMMARY

An apparatus is provided to improve audio processing. The apparatus includes a processor configured to execute a process based on an operating system (OS), and an audio signal processing part to support inputs of a first audio signal which is associated with the OS and a second audio signal which is inputted via a second input unit that is different from the first input unit. The audio signal processing part has a first processing mode and a second processing mode in which the audio signal processing part outputs an audio signal based only on the second audio signal. The apparatus also includes a setting part configured to set the audio signal processing part to the first processing mode when the process based on the OS is executed by the processor and to the second processing mode when the process based on the OS is at least partially limited.

The apparatus also includes a second audio signal processing part configured to output, based on an audio signal associated with the process based on the OS, the second audio signal. In some examples, the apparatus includes a power supply part configured to supply electric power to a first processor, a second processor, the audio signal processing part, the second audio signal processing part, and the setting part. The power supply part, in certain examples, keeps on supplying electric power to the audio signal processing part when the power supply part stops supplying electric power to the first processor.

In certain examples, the apparatus also includes an output part configured to output an audio signal outputted from the audio signal processing part or a sound based on the audio signal. The first processor outputs, in the first processing mode, an audio signal obtained by mixing the second audio signal inputted to the audio signal processing part via the second input unit and the first audio signal to the audio signal processing part, and the first audio signal processing part outputs an audio signal based on the audio signal mixed by the first processor.

Corresponding systems and methods are provided to implement the features of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
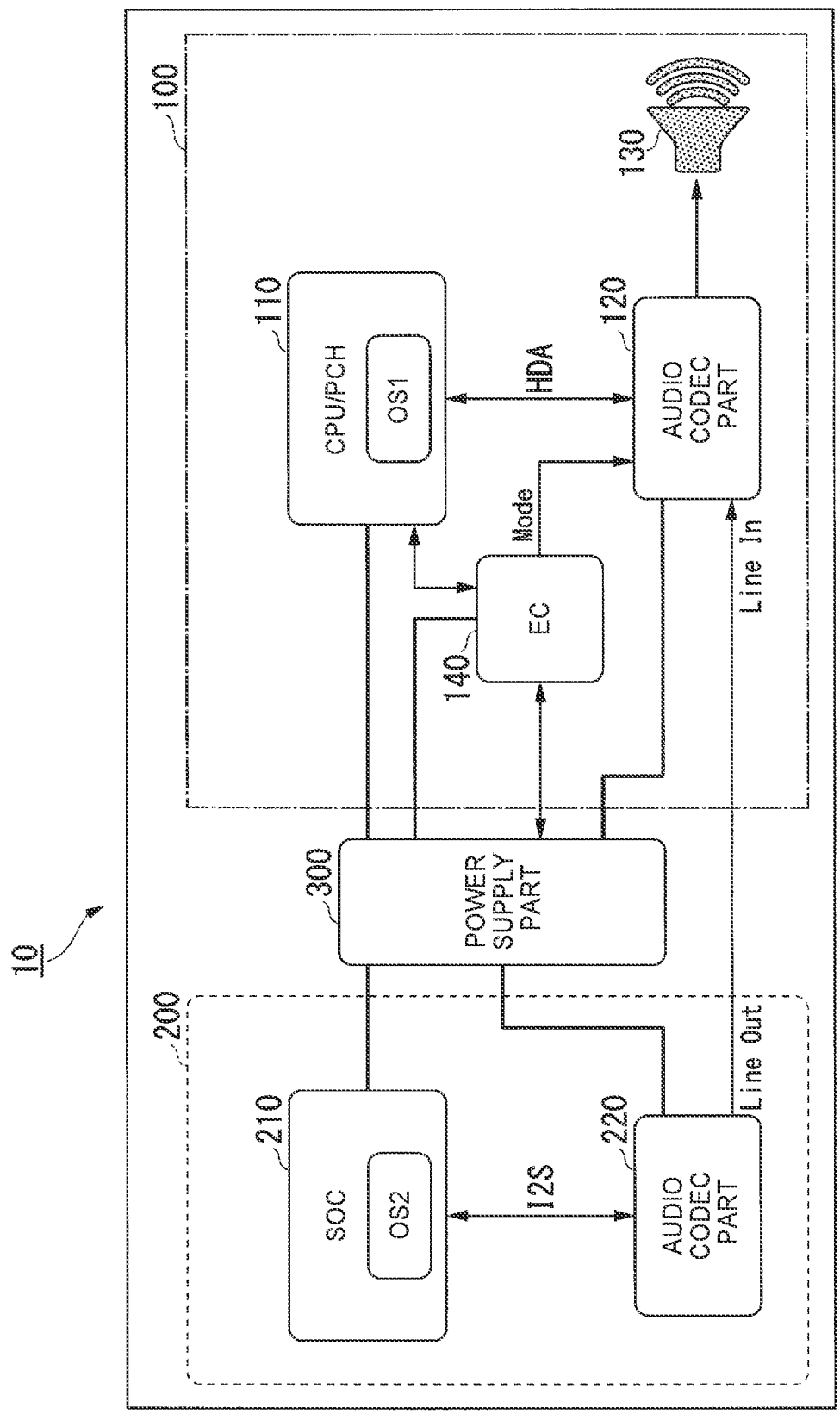
FIG. 1 is a block diagram showing an example of a signal processing apparatus, according to examples of the subject disclosure.

Embodiments of the present invention will now be described in detail with reference to the drawings. In the drawings, like parts are referred to by like reference numerals.

FIG. 1 is a block diagram showing a configuration example of a signal processing apparatus 10 according to this embodiment. The signal processing apparatus 10 is a personal computer that includes therein two types of processors respectively executing processes according to two types of OSs. The signal processing apparatus 10 may, for example, be a personal computer of any type, such as a desktop, a laptop, or a tablet.

In one example, the signal processing apparatus 10 includes: a first processing part 100 having a first processor executing a process based on a first OS (hereinafter referred to as an "OS1"); a second processing part 200 mounted with a second processor executing a process based on a second OS (hereinafter referred to as an "OS2"); and a power supply part 300. The power supply part 300 supplies electric power to the first processing part 100 and the second processing part 200 based on electric power supplied from a built-in battery or an AC adapter. The power supply part 300 also controls charging of the built-in battery based on the electric power supplied from the AC adapter.

The OS1 is Windows®, for example. The first processor includes a CPU that executes the process based on the OS1 and a chipset (e.g., a platform controller hub (PCH)). In the following, the first processor is conveniently referred to as a "CPU 110".

The OS2 is Android®, for example. The second processor includes a system on a chip (SOC) that executes the process based on the OS2. The SOC is a chip that integrates a plurality of ICs such as a CPU, a GPU, and a chipset. In the following, the second processor is conveniently referred to as an "SOC 210".

Note that the OS1, OS2, CPU 110 and SOC 210 described in this embodiment are mere examples and are not intended to be limiting. Therefore, the signal processing apparatus may include any OS and processor.

The first processing part 100 includes the CPU 110, an audio codec part 120, an output part 130, an embedded controller (EC) 140, and so on. The CPU 110 executes the process based on the OS1 (i.e., the OS1 executes the process, or an application operating on the OS1 executes the process).

The audio codec part 120 includes an input unit (first input unit) through which an audio signal is inputted from the CPU 110. For example, the signal processing apparatus 10 supports an HDA (High Definition Audio) system. A digital audio signal of a start sound, alarm sound, notification sound or the like associated with the process based on the OS1 or a digital audio signal of music and voice reproduced by the application operating on the OS1 are inputted from the CPU 110 via a bus (e.g., an HDA bus compliant with the HDA standard) to the audio codec part 120. The audio codec part 120 performs a process such as a decoding and a D/A conversion on the inputted audio signal and outputs a processed analog audio signal to the output part 130.

The audio codec part 120 includes another input unit (second input unit) that is different from the input unit from the CPU 110 in order to support a line input, for example. The audio codec part 120 performs a process such as an A/D conversion on an analog audio signal inputted via the line input and outputs a processed audio signal to the CPU 110 via the HDA bus. In one example, the CPU 110 mixes the processed audio signal and the audio signal associated with the process based on the OS1 and outputs a mixed digital audio signal to the audio codec part 120 via the HDA bus. Upon input of the mixed audio signal from the CPU 110, the audio codec part 120 decodes and D/A converts the mixed audio signal and outputs a processed audio signal to the output part 130. The audio codec part 120 can alternatively output only the analog audio signal inputted via the line input to the output part 130.

Figure 2:
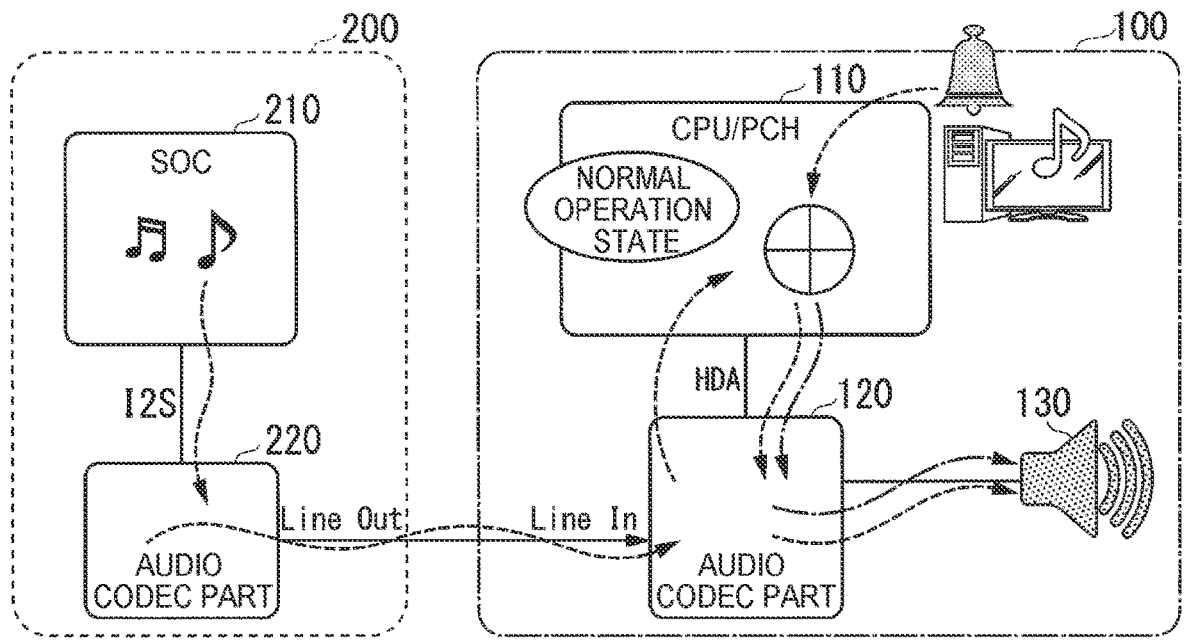
FIG. 2 is block diagram of a first processing mode, according to examples of the subject disclosure.
Figure 3:
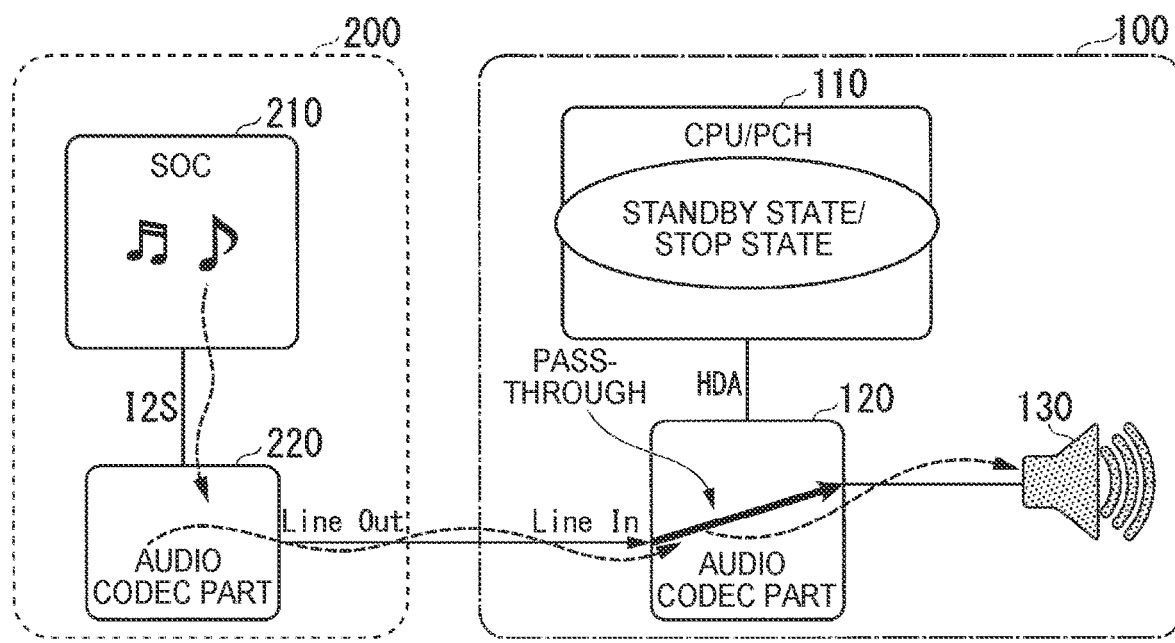
FIG. 3 is block diagram of a second processing mode, according to examples of the subject disclosure.

In the following, a mode in which the mixed audio signal is outputted is referred to as a "first processing mode". FIG. 2 shows a flow of the audio signal in the first processing mode. Meanwhile, a mode in which only the analog audio signal inputted via the line input is outputted is referred to as a "second processing mode". The second processing mode is, for example, a so-called pass-through mode. FIG. 3 shows a flow of the audio signal in the second processing mode.

In one example, the output part 130 includes a speaker and an audio amplifier and outputs a sound based on the audio signal outputted from the audio codec part 120. The output part 130 may include a phone jack (e.g., an earphone terminal) instead of or in addition to the speaker. The output part 130 may then output the audio signal outputted from the audio codec part 120 to an earphone or a headphone connected to the phone jack, for example.

The EC 140 is a built-in controller incorporating a microcomputer that monitors and controls various devices (such as a peripheral device and a sensor) irrespective of the process of the CPU 110. The EC 140 has functions such as battery management, power supply management, and a keyboard controller. In one example, the EC 140 instructs the power supply part 300 to switch on/off the power supply from the power supply part 300 to components included in the first processing part 100 and the second processing part 200.

The EC 140 also controls whether the audio codec part 120 is set to the first processing mode or the second processing mode. For example, the EC 140 sets the audio codec part 120 to the first processing mode when the process based on the OS1 is executed by the CPU 110. On the other hand, the EC 140 sets the audio codec part 120 to the second processing mode when the process based on the OS1, which is executed by the CPU 110, is at least partially limited.

Here, when the process based on the OS1 may be executed in a normal operation state. In the normal operation state, the process based on the OS1 can be executed without any particular limitation. This normal operation state corresponds to S0 state defined in the ACPI (Advanced Configuration and Power Interface), for example. A partially limited state refers to the OS1 being in a standby state or a stopped state (stop state). In the standby state, a screen is off, and power consumption of the CPU 110 is lower than that in the normal operation state, or the power supply to the CPU 110 is stopped. The standby state corresponds to Modern Standby in Windows® or S3 state (sleep state) defined in the ACPI, for example. In the stop state, the OS1 is in a hibernation state or a shutdown state which correspond to S4 or S5 state defined in the ACPI.

Note that the EC 140 can set the audio codec part to the first or second processing mode by turning off or on the second processing mode (pass-through mode). That is, the audio codec part 120 operates in the second processing mode when the EC 140 turns on the second processing mode (pass-through mode) and in the first processing mode when the EC 140 turns off the second processing mode (pass-through mode).

When the process based on the OS1 is at least partially limited (i.e., in the standby or stop state), the EC 140 may cause the power supply to the CPU 110 to stop. Even in that case, the EC 140 still allows the power supply to the audio codec part 120 to be continued. In other words, the power supply part 300 keeps on supplying electric power to the audio codec part 120 even when the power supply part 300 stops supplying the electric power to the CPU 110. As a result, the audio codec part 120 can output the audio signal associated with the process based on the OS2 even when the process based on the OS1 is at least partially limited (i.e., in the standby or stop state).

The second processing part 200 includes the SOC 210, an audio codec part 220, and so on. The SOC 210 executes the process based on the OS2 (i.e., the OS2 executes the process, or an application operating on the OS2 executes the process).

The audio codec part 220 outputs, via a line output, an audio signal based on a digital audio signal which has been processed in and is inputted from the SOC 210. For example, the digital audio signal is inputted from the SOC 210 to the audio codec part 220 via a bus (e.g., an I2S bus compliant with the Inter-IC Sound standard). The audio codec part 220 performs a process such as a decoding and a D/A conversion on the inputted audio signal and outputs a processed analog audio signal via the line output. The audio signal outputted via the line output is inputted to the audio codec part 120 via the line input. In one example, an audio signal of a start sound, alarm sound, notification sound or the like associated with the process based on the OS2 or an audio signal of music and voice reproduced by the application operating on the OS2 are inputted to the audio codec part 120 via the line input.

Figure 4:
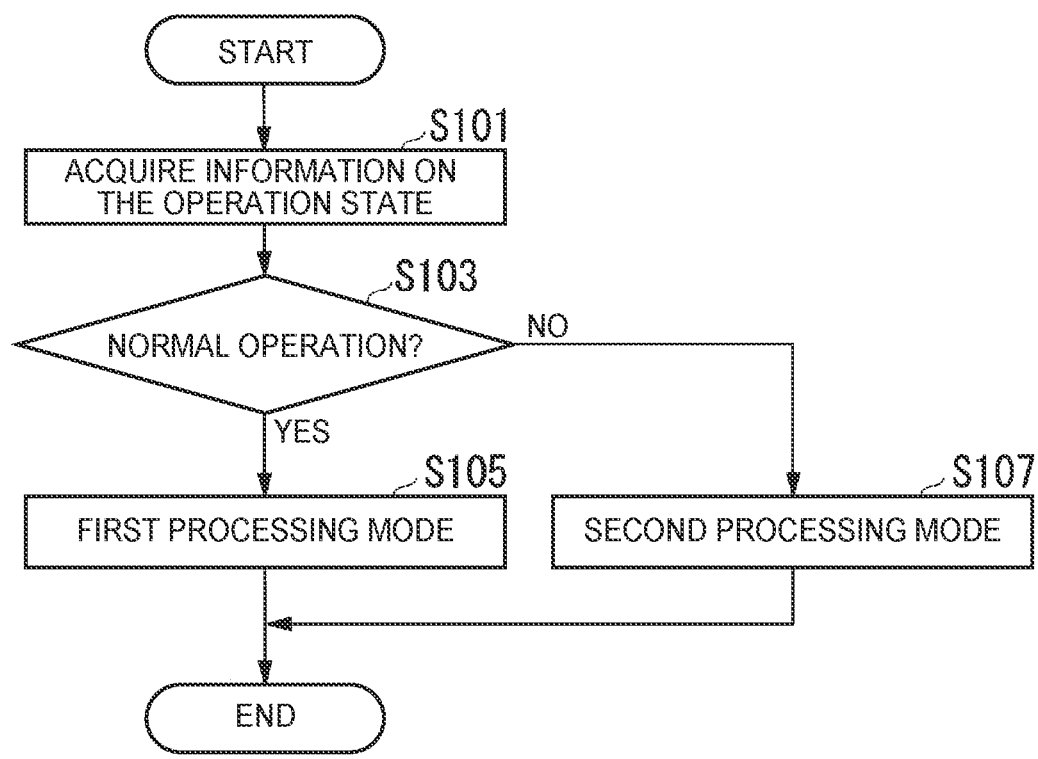
FIG. 4 is a flow chart showing a control process, according to examples of the subject disclosure.

FIG. 4 is a flow chart showing an example of the audio mode setting process according to this embodiment. The EC 140 acquires information on the operation state of the OS1. For example, the EC 140 acquires, from the CPU 110, information indicating that the OS1 is in a normal operation state, standby state or stop state; information indicating a transition from the normal operation state to the standby or stop state; or information indicating a transition from the standby or stop state to the normal operation state (step S101).

Then, based on the information acquired in the step S101, the EC 140 determines whether or not the OS1 is in the normal operation state (step S103). If it is determined that the OS1 is in the normal operation state (YES), the EC 140 sets the audio codec part 120 to the first processing mode (step S105). If it is determined that the OS1 is not in the normal operation state (NO), the EC 140 sets the audio codec part 120 to the second processing mode (step S107).

Figure 5:
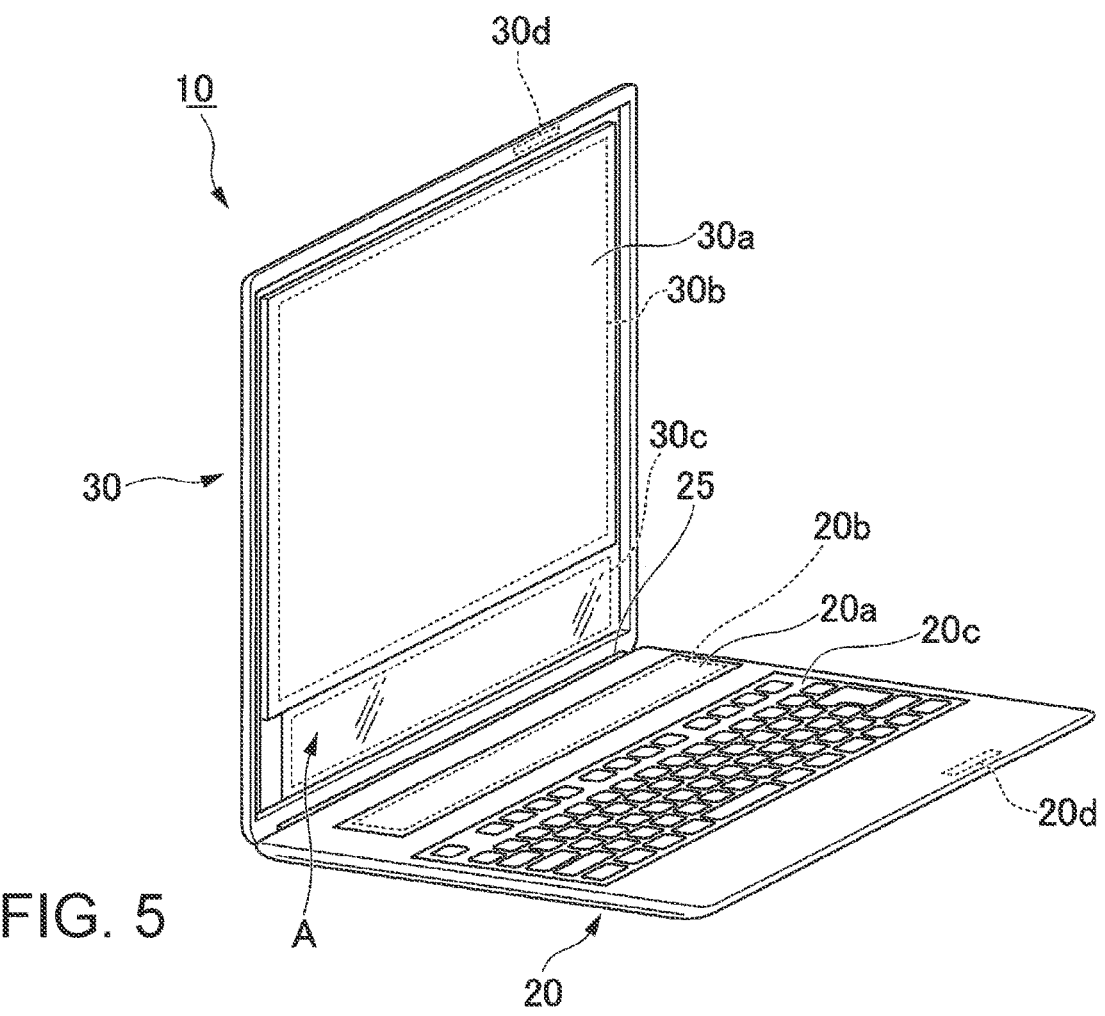
FIG. 5 is a perspective view of the signal processing apparatus, according to examples of the subject disclosure.

FIG. 5 is a perspective view of the signal processing apparatus 10 according to this embodiment. The signal processing apparatus 10 shown in FIG. 5 is a personal computer of a Laptop type including a main body 20 and a cover part 30. The cover part 30 is rotatable relative to the main body 20 so as to be opened and closed through a hinge 25. In the closed state, the cover part 30 covers the main body 20 with a display part 30*a* facing the main body 20, and the main body 20 and the cover part 30 are overlapped with each other. In the open state, the cover part 30 is rotated by a predetermined degree or greater from the closed state so that the display part 30*a* of the cover part 30 is visible.

The main body 20 has a chassis of a flat shape extending in the right-left and front-rear directions. Inside the chassis, there are provided a motherboard (substrate) on which electronic components are mounted to realize functions of the respective parts shown in FIG. 1, a battery, and others. The main body 20 is pivotably coupled to the cover part 30 through the hinge 25. The main body 20 and the cover part 30 may be separable.

The main body 20 includes a display part 20*a*, a touch sensor 20*b*, an input part 20*c*, and a detection part 20*d*. The display part 20*a* includes a liquid-crystal display (LCD), an organic electro luminescence (EL) display or the like. The display part 20*a* has a rectangular shape that is longer in the right-left direction and shorter in the front-rear direction and is positioned closer to the hinge 25 than the input part 20*c*. The display part 20*a* displays information corresponding to the process based on the OS2. The input part 20*c* is a keyboard, for example.

Figure 7A:
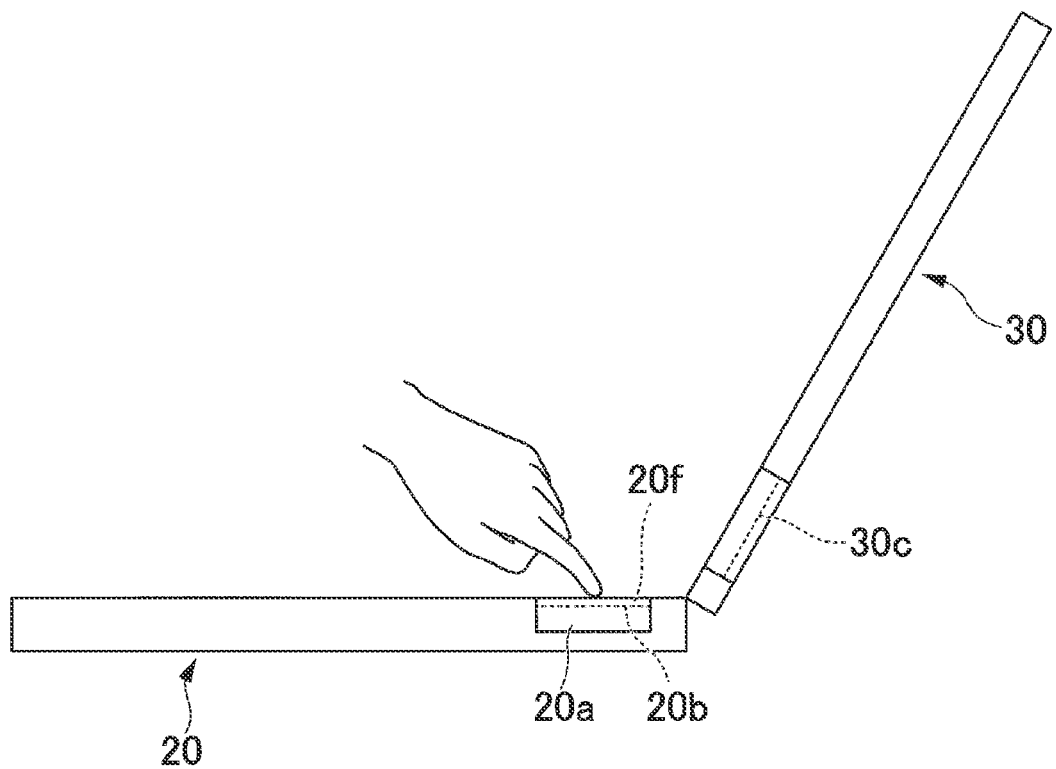
FIG. 7A is a drawing of the signal processing apparatus in an open state viewed from a side, according to examples of the subject disclosure.

The touch sensor 20*b* is positioned to overlap with a display surface of the display part 20*a* so that the display part 20*a* and the touch sensor 20*b* together form a touch panel. A surface of the touch sensor 20*b* is covered by a transparent cover 20*f* (see FIGS. 7A and 7B). In an example, the touch sensor 20*b* includes a sensor of an electrostatic type and detects a position touched by a user. The touch sensor 20*b* is transparent. Therefore, the display part 20*a* is visible through the transparent cover 20*f* and the touch sensor 20*b*. The touch sensor 20*b* thus detects an operation of the user on the display surface of the display part 20*a* (see FIG. 7A). Note that FIG. 7A shows the signal processing apparatus 10 in an open state viewed from a side.

The cover part 30 includes a display part 30*a* and a touch sensor 30*b*. The display part 30*a* includes an LCD, an organic EL display or the like. The display part 30*a* displays information corresponding to the process based on the OS1. The touch sensor 30*b* is positioned to overlap with a top surface of the display part 30*a* so that the display part 30*a* and the touch sensor 30*b* together form a touch panel.

The touch sensor 30*b* is positioned to overlap with a display surface of the display part 30*a* so that the display part 30*a* and the touch sensor 30*b* together form a touch panel. The touch sensor 30*b* includes a sensor of an electrostatic type, for example, and detects a position touched by a user. The touch sensor 30*b* thus detects an operation of the user on the display surface of the display part 30*a*.

The cover part 30 has a transparent region A including at least a region that is closer to the hinge 25 than the display part 30*a*. In an example, the transparent region A is positioned to cover the display part 20*a* of the main body 20 when the cover part 30 is closed. In a part of the transparent region A, a touch sensor 30*c* is provided.

A detection target part 30*d* is provided at an edge of the cover part 30 so as to be opposed to the detection part 20*d* provided at an edge of the main body 20 in the closed state. For example, a magnetic sensor such as a hall sensor can be used as the detection part 20*d*. A magnet can be used as the detection target part 30*d*. The detection part 20*d* can detect whether the cover part 30 is opened or closed by sensing variations in a magnetic field of the detection target part 30*d* caused by the movement of opening and closing the cover part 30.

The display part 30*a*, the touch sensor 30*b*, and the touch sensor 30*c* included in the cover part 30 are electrically connected with the motherboard and others in the main body 20 via a flexible substrate passing through the hinge 25, for example.

Figure 6:
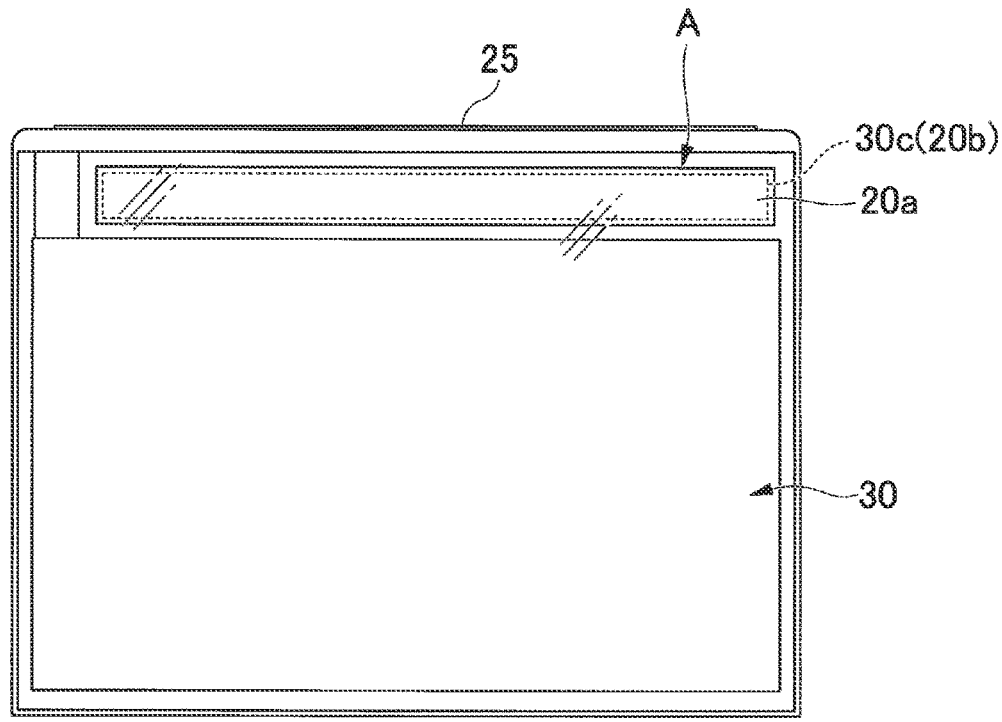
FIG. 6 is a side view diagram of the signal processing apparatus in a closed state, according to examples of the subject disclosure.
Figure 7B:
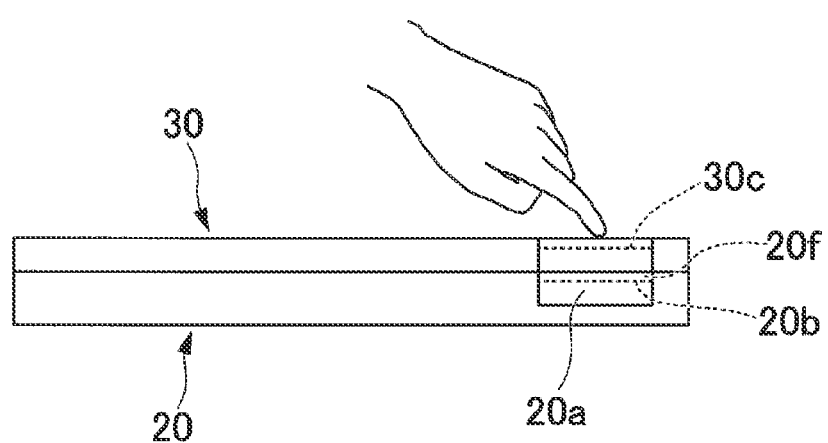
FIG. 7B is a drawing of the signal processing apparatus in a closed state viewed from a side, according to examples of the subject disclosure.

FIG. 6 is a drawing of the signal processing apparatus 10 in a closed state viewed from a cover part 30 side. The open cover part 30 shown in FIG. 5 has been rotated about the hinge 25 to close so that the cover part 30 and the main body 20 are overlapped with each other in FIG. 6. As shown in FIG. 6, when the cover part 30 is closed, the transparent region A is superimposed on the display part 20*a*. That is, the transparent region A covers the display part 20*a*. As such, the display part 20*a* is visible to the user through the transparent region A. In the closed state, the touch sensor 30*c* provided in the transparent region A is positioned to overlap with the display surface of the display part 20*a*. As a result, the touch sensor 30*c*, instead of the touch sensor 20*b*, and the display part 20*a* together form a touch panel, and the touch sensor 30*c* detects an operation of the user on the display surface of the display part 20*a* (see FIG. 7B). Note that FIG. 7B shows the signal processing apparatus 10 in the closed state viewed from a side.

As described above, in the open state, the signal processing apparatus 10 displays the information corresponding to the process based on the OS2 in the display part 20*a* and the information corresponding to the process based on the OS1 in the display part 30*a*, and can receive the operations of the user on the respective display surfaces. In the closed state in which the OS1 transits into the standby or stop state, the signal processing apparatus 10 displays the information corresponding to the process based on the OS2 in the display part 20*a* and can receive the operation of the user on the display part 20*a*.

The EC 140 determines whether the signal processing apparatus is in the open or closed state based on the detection results of the detection part 20d. The EC 140 also controls the operation state of the OS1 and OS2 based on the determination of the open or closed state. In an example, when the signal processing apparatus is in the open state and both the OS1 and OS2 is in the normal operation state, the EC 140 gives an instruction to the CPU 110 upon determination of the closed state so as to cause the OS1 to transit into the standby or stop state. In other words, in the open state, the signal processing apparatus 10 outputs the audio signal obtained by mixing the audio signal associated with the process based on the OS1 and the audio signal associated with the process based on the OS2. In the closed state, although the OS1 goes into the standby or stop state, the signal processing apparatus 10 can still output only the audio signal associated with the process based on the OS2.

As described above, the signal processing apparatus 10 according to this embodiment includes the CPU 110 (an example of the first processor) executing the process based on the OS1 (an example of the first OS) and the SOC 210 (an example of the second processor) executing the process based on the OS2 (an example of the second OS). The signal processing apparatus 10 further includes the audio codec part 120 (an example of the first audio signal processing part) and the EC 140 (an example of the setting part). The audio codec part 120 supports inputs of the audio signal (first audio signal) which is associated with the process based on the OS1 and is inputted from the CPU 110 via the HDA bus (an example of the first input unit) and the audio signal (second audio signal) which is associated with the process based on the OS2 and is inputted via the line input (an example of the second input unit). The audio codec part 120 has the first processing mode in which the audio codec part 120 outputs the audio signal obtained by mixing the audio signal associated with the process based on the OS1 and the audio signal associated with the process based on the OS2 and the second processing mode in which the audio codec part 120 outputs the audio signal based only on the audio signal associated with the process based on the OS2. The EC 140 sets the audio codec part 120 to the first processing mode when the CPU 110 is executing the process based on the OS1 (e.g., when the OS1 is in the normal operation state). The EC 140 sets the audio codec part 120 to the second processing mode when the process based on the OS1, which is executed by the CPU 110, is at least partially limited (e.g., when the OS1 is in the standby or stop state).

Thus, the signal processing apparatus 10 can execute the processes based on the OS1 and OS2 respectively. That is, in the normal operation state, the signal processing apparatus 10 outputs the audio signal obtained by mixing the audio signal associated with the process based on the OS1 and the audio signal associated with the process based on the OS2, and even when the OS1 goes into the standby or stop state, the signal processing apparatus 10 can still output the audio signal associated with the process based on the OS2. In other words, the signal processing apparatus 10 can appropriately output the audio signal according to the respective inputs from a plurality of input sources depending on the operation state of the OSs. For example, if the user only wants to listen to music, he or she can close the cover part 30 of the signal processing apparatus 10 to put the OS1 into the standby or stop state. Since the signal processing apparatus 10 can nevertheless reproduce music according to the process based on the OS2, the user can listen to the music while suppressing power consumption and allowing use for a long time. Generally, if the OS1 is Windows® and the OS2 is Android®, executing the process based on the OS1 consumes more electric power than on the OS2. As such, it is possible to more effectively suppress power consumption by putting the OS1 into the standby or stop state rather than the OS2. Furthermore, the signal processing apparatus 10 can then output sound of higher quality, because it is often the case that an audio circuit of the first processing part 100 executing the process based on the OS1 has higher performance than an audio circuit of the second processing part 200 executing the process based on the OS2.

The signal processing apparatus 10 further includes the audio codec part 220 (an example of the second audio signal processing part). The audio codec part 220 outputs, based on the audio signal associated with the process based on the OS2 and inputted from the SOC 210, the audio signal via the line output. The outputted audio signal is inputted into the audio codec part 120 via the line input. Thus, in the signal processing apparatus 10, the audio signal associated with the process based on the OS2 can be outputted via the line output and then inputted to the audio codec part 120 of the first processing part 100 via the line input.

The signal processing apparatus 10 further includes the power supply part 300 that supplies electric power to the CPU 110, the SOC 210, the audio codec part 120, the audio codec part 220, and the EC 140 (an example of the setting part). The power supply part 300 keeps on supplying electric power to the audio codec part 120 when the power supply part 300 stops supplying the electric power to the CPU 110. Thus, in the signal processing apparatus 10, the audio signal associated with the process based on the OS2 and inputted to the audio codec part 120 via the line input can be outputted even when the power supply to the CPU 110 is stopped.

The signal processing apparatus 10 further includes the output part 130 that outputs the audio signal outputted from the audio codec part 120 or the sound based on the audio signal. This allows the signal processing apparatus 10 to output, in the first processing mode, the audio signal or the sound based on the audio signal obtained by mixing the audio signal associated with the process based on the OS1 and the audio signal associated with the process based on the OS2. This also allows the signal processing apparatus 10 to output, in the second processing mode, the audio signal associated with the process based on the OS2 or the sound based on the audio signal.

In the first processing mode, the audio codec part 120 converts the analog audio signal inputted via the line input to the digital audio signal and outputs the analog audio signal to the CPU 110. The CPU 110 outputs the audio signal (e.g., the digital audio signal) obtained by mixing the audio signal inputted converted by the audio codec part 120 (e.g., an audio signal converted from analog to digital) and the audio signal associated with the process based on the OS1 (e.g., a digital audio signal) to the audio codec part 120. The audio codec part 120 then outputs the audio signal (e.g., an audio signal converted from digital to analog) based on the audio signal mixed by the CPU 110 (e.g., the digital audio signal) to the output part 130. Thus, in the signal processing apparatus 10, the CPU 110 can mix the audio signal associated with the process based on the OS2 and inputted via the line input and the audio signal associated with the process based on the OS1. In the first embodiment, the signal processing apparatus 10 includes both the OS1 and OS2 therein and the audio signal of the OS2 side is inputted to the audio codec part 120 of the OS1 side via the line input. The second embodiment, in contrast, describes a configuration example in which an audio signal outputted from an external device via a line output is inputted to an audio codec part 120 via a line input.

Figure 8:
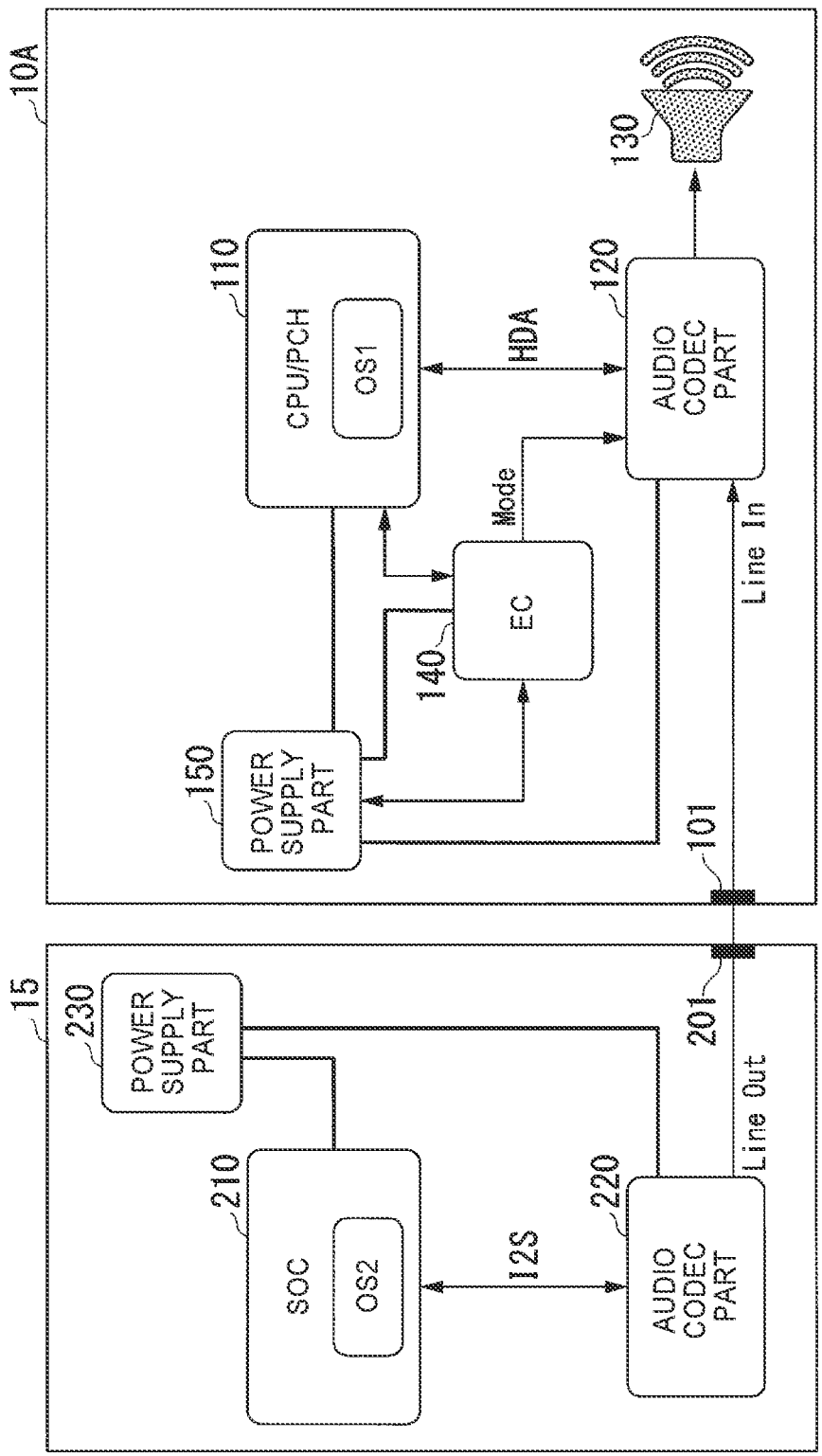
FIG. 8 is a block diagram showing a configuration example of a signal processing apparatus, according to examples of the subject disclosure.

FIG. 8 is a block diagram showing a configuration example of a signal processing apparatus 10A according to this embodiment. In FIG. 8, components corresponding to those in FIG. 1 are referred to by like reference numerals. The signal processing apparatus 10A includes a CPU 110 that executes a process based on the OS1, the audio codec part 120 connected to the CPU 110 via an HDA bus, an output part 130, an EC 140, a power supply part 150, and so on. The power supply part 150 supplies electric power to components included in the signal processing apparatus 10A.

In the present embodiment, the line input of the audio codec part 120 is connected to a line input terminal 101 to which the audio signal outputted from the external device is inputted via a line output of the external device. The audio codec part 120 operates in the first or second processing mode described in the first embodiment with respect to the audio signal inputted from the CPU 110 via the HDA bus and the audio signal inputted from the line input terminal 101. For example, the EC 140 sets the audio codec part 120 to the first processing mode when the CPU 110 is executing the process based on the OS1 (i.e., when the OS1 is in the normal operation state). On the other hand, the EC 140 sets the audio codec part 120 to the second processing mode when the process based on the OS1, which is executed by the CPU 110, is at least partially limited (i.e., when the OS1 is in the standby or stop state).

When the process based on the OS1 is at least partially limited (i.e., in the standby or stop state), the EC 140 may cause the power supply to the CPU 110 to stop. Even in that case, the EC 140 still allows the power supply to the audio codec part 120 to be continued. In other words, the power supply part 150 keeps on supplying electric power to the audio codec part 120 even when the power supply part 150 stops supplying electric power to the CPU 110. This allows the audio codec part 120 to cause the output part 130 to output the audio signal inputted from the external device via the line input even when the process based on the OS1 is at least partially limited (i.e., in the standby or stop state).

A signal processing apparatus 15 shown in FIG. 8 is an example of the external device which outputs the audio signal to be inputted to the line input terminal 101 of the signal processing apparatus 10A. The signal processing apparatus 15 includes an SOC 210 that executes the process based on the OS2, an audio codec part 220 connected with the SOC 210 via an I2S bus, and a power supply part 230. The power supply part 230 supplies electric power to components included in the signal processing apparatus 15. The audio codec part 220 outputs, via a line output, an audio signal based on a digital audio signal which has been processed in and is inputted from the SOC 210. In one example, the audio codec part 220 outputs the audio signal from a line output terminal 201 via the line output.

As described above, the signal processing apparatus 10A according to this embodiment includes the CPU 100 (an example of the processor) executing the process based on the OS1 (an example of the OS), the audio codec part 120 (an example of the audio signal processing part), and the EC 140 (an example of the setting part). The audio codec part 120 supports inputs of the audio signal (first audio signal) which is associated with the process based on the OS1 and is inputted from the CPU 110 via the HDA bus (an example of the first input unit) and the audio signal (second audio signal) which is inputted via the line input (an example of the second input unit). The audio codec part 120 has the first processing mode in which the audio codec part 120 outputs the audio signal obtained by mixing the audio signal associated with the process based on the OS1 and the audio signal inputted via the line input and the second processing mode in which the audio codec part 120 outputs the audio signal based only on the audio signal inputted via the line input. The EC 140 sets the audio codec part 120 to the first processing mode when the CPU 110 is executing the process based on the OS1. The EC 140 sets the audio codec part 120 to the second processing mode when the process based on the OS1, which is executed by the CPU 110, is at least partially limited (e.g., when the OS1 is in the standby or stop state).

Thus, in the normal operation state, the signal processing apparatus 10A outputs the audio signal obtained by mixing the audio signal associated with the process based on the OS1 and the audio signal inputted from the external device via the line input, and even when the OS1 goes into the standby or stop state, the signal processing apparatus 10A can still output the audio signal inputted from the external device via the line input. In other words, the signal processing apparatus 10A can appropriately output the audio signal according to the respective inputs from a plurality of input sources depending on the operation state of the OSs. For example, if the user wants to listen to music while he or she creates a document on the signal processing apparatus 10A, connecting an external device capable of reproducing music to the line terminal of the signal processing apparatus 10A allows the music to be reproduced by the signal processing apparatus 10A conveniently. In addition, when the user suspends the work of creating the document and takes a break, he or she can put the OS1 of the signal processing apparatus 10A into the standby or stop state. Since the signal processing apparatus 10A can nevertheless output music, it is possible to suppress power consumption and allow use for a long time.

The first and second embodiments of the present invention have been described in detail in the above with reference to the drawings. Note that the specific configuration thereof is not limited to those described above, and various design changes and the like may be made within the scope of the present invention. Although the foregoing embodiments have described examples in which the audio signal inputted to the audio codec part 120 via the line input and the audio signal associated with the process based on the OS1 are mixed by the CPU 110, the audio signals may be mixed by the audio codec part 120. Instead of the line input and the line output in the foregoing embodiments, a microphone input and a microphone output may be provided. It is also possible to provide the line input and output as well as the microphone input and output and to respectively apply thereto the first processing mode and the second processing mode according to the foregoing embodiments.

Note that the above described signal processing apparatus 10 (10A) includes a computer system therein. A process in each component included in the signal processing apparatus 10 (10A) may be executed by recording a program for realizing functions of the respective components in a computer readable recording medium, and causing the computer system to read the program recorded in the recording medium for execution. Here, "causing the computer system to read the program recorded in the recording medium for execution" includes installing the program in the computer system. The "computer system" herein includes an OS and hardware such as a peripheral device. The "computer system" may include a plurality of computer devices connected via a network including the Internet, a WAN, a LAN, and a communication line such as a dedicated line. The "computer readable recording medium" refers to a portable medium such as a flexible disk, a magneto-optical disk, a ROM or a CD-ROM, or a storage device such as a hard disk incorporated in the computer system. Thus, a recording medium storing the program may be a non-transitory recording medium such as a CD-ROM.

The recording medium may include an internally- or externally-provided recording medium that is accessible from the distribution server to distribute the program. The program may be divided into a plurality of program parts to be downloaded at different timings and then combined in each component included in the signal processing apparatus 10 (10A). The divided program parts may be respectively distributed by different distribution servers. The "computer-readable recording medium" may include a medium that holds the program for a certain period of time such as a volatile memory (RAM) inside the computer system serving as a server or a client when the program is transmitted via the network. The program may be one for realizing a part of the functions described above. The program may also be one that can realize the functions described above in combination with a program already recorded in the computer system, or a so-called differential file (differential program).

Moreover, a part or all of the functions of the signal processing apparatus 10 (10A) in the above described embodiments may be realized as an integrated circuit such as a large-scale integration (LSI). Each function may be formed into a processor individually, or a part or all of the functions may be integrated and formed into a processor. The circuit integration may be realized not only with the LSI but also with a dedicated circuit or a general-purpose processor. If, due to advance in semiconductor technology, a circuit integration technology alternative to the LSI is found, an integrated circuit according to the technology may be used.

What is claimed is:

1. A system comprising:
   a first processor configured to execute a process based on a first operating system (OS);
   a second processor configured to execute a process based on a second OS;
   a first audio signal processing part configured to support inputs of a first audio signal which is associated with the process based on the first OS and is inputted from the first processor via a first input unit and a second audio signal which is associated with the process based on the second OS and is inputted via a second input unit that is different from the first input unit, wherein the first audio signal processing part has a first processing mode in which the first audio signal processing part outputs an audio signal obtained by mixing the first audio signal and the second audio signal and a second processing mode in which the first audio signal processing part outputs an audio signal based only on the second audio signal;
   a second audio signal processing part configured to output, based on an audio signal associated with the process based on the second OS and inputted from the second processor, the second audio signal;
   a setting part configured to set the first audio signal processing part to the first processing mode when the process based on the first OS is executed by the first processor and to the second processing mode when the process based on the first OS is at least partially limited; and
   a power supply part configured to supply electric power to the first processor, the second processor, the first audio signal processing part, the second audio signal processing part, and the setting part, and wherein the power supply part is configured to continue to supply electric power to the first audio signal processing part in response to the power supply part stopping a supply of electric power to the first processor.

2. The system of claim 1, further comprising an output part configured to output an audio signal outputted from the first audio signal processing part or a sound based on the audio signal.

3. The system of claim 1, wherein the first processor is configured to output, in the first processing mode, an audio signal obtained by mixing the second audio signal inputted to the first audio signal processing part via the second input unit and the first audio signal to the first audio signal processing part.

4. The system of claim 3, where the first audio signal processing part is configured to output an audio signal based on the audio signal mixed by the first processor.

5. An audio processing apparatus comprising:
   a first processor configured to execute a process based on an operating system (OS);
   a first audio signal processing part configured to support inputs of a first audio signal which is associated with the process based on the OS and is inputted from the first processor via a first input unit and a second audio signal which is inputted via a second input unit that is different from the first input unit, wherein the first audio signal processing part has a first processing mode in which the first audio signal processing part outputs an audio signal obtained by mixing the first audio signal and the second audio signal and a second processing mode in which the first audio signal processing part outputs an audio signal based only on the second audio signal;
   a second audio signal processing part configured to output, based on an audio signal associated with the process based on the second OS and inputted from a second processor, the second audio signal;
   a setting part configured to set the audio signal processing part to the first processing mode when the process based on the OS is executed by the first processor and to the second processing mode when the process based on the OS is at least partially limited; and
   a power supply part configured to supply electric power to the first processor, the second processor, the first audio signal processing part, the second audio signal processing part, and the setting part, and wherein the power supply part is configured to continue to supply electric power to the first audio signal processing part in response to the power supply part stopping a supply of electric power to the first processor.

6. The audio processing apparatus of claim 5, further comprising an output part configured to output an audio signal outputted from the audio signal processing part or a sound based on the audio signal.

7. The audio processing apparatus of claim 6, wherein the first processor outputs, in the first processing mode, an audio signal obtained by mixing the second audio signal inputted to the audio signal processing part via the second input unit and the first audio signal to the audio signal processing part, and the first audio signal processing part outputs an audio signal based on the audio signal mixed by the first processor.

8. A program product comprising a computer readable storage medium that stores code executable by a processor, the executable code comprising code to:
    executing a process based on an operating system (OS) by a processor;
    outputting, in a first processing mode, an audio signal by an audio signal processing part, the audio signal being obtained by mixing a first audio signal which is associated with the process based on the OS and is inputted from the processor via a first input unit and a second audio signal which is inputted via a second input unit that is different from the first input unit;
    outputting, in a second processing mode, an audio signal based only on the second audio signal by the audio signal processing part;
    outputting, based on an audio signal associated with the process based on the OS, the second audio signal;
    setting, by a setting part, the audio signal processing part to the first processing mode when the process based on the OS is executed by the processor and to the second processing mode when the process based on the OS is at least partially limited; and
    supplying electric power to a first processor, a second processor, the audio signal processing part, a second audio signal processing part, and the setting part; and
    continuing to supply electric power to the audio signal processing part in response to a power supply part stopping a supply of electric power to the first processor.

9. The program product of claim 8, further comprising code to output an audio signal outputted from the audio signal processing part or a sound based on the audio signal.

10. The program product of claim 9, further comprising code to output, in the first processing mode, an audio signal obtained by mixing the second audio signal inputted to the audio signal processing part via the second input unit and the first audio signal to the audio signal processing part.

11. The program product of claim 10, further comprising code to output an audio signal based on the audio signal mixed by the first processor.

* * * * *